F. G. LIADY.
INTERLOCKING PIPE WELD.
APPLICATION FILED APR. 20, 1917.

1,260,690.

Patented Mar. 26, 1918.

Inventor
Fred G. Liady
by Hazard & Miller
Att'ys.

UNITED STATES PATENT OFFICE.

FRED GARDNER LIADY, OF FULLERTON, CALIFORNIA.

INTERLOCKING PIPE-WELD.

1,260,690.

Specification of Letters Patent.

Patented Mar. 26, 1918.

Application filed April 20, 1917. Serial No. 163,463.

*To all whom it may concern:*

Be it known that I, FRED GARDNER LIADY, a citizen of the United States, residing at Fullerton, in the county of Orange and State of California, have invented new and useful Improvements in Interlocking Pipe-Welds, of which the following is a specification.

My object is to put new ends on old drill stems and the like.

Referring more particularly to the drawings, 10 indicates one of the pipe lengths used to form a drill-pipe. These members are normally made with a threaded end which is formed by up-setting the end of the pipe and thereafter forming the threads thereon. In case these pipes are fractured, the fracture will usually occur adjacent this threaded end and the present invention is therefore concerned with a pipe fitting 12 having screw threads 11 which may be mounted upon the end of the pipe and which will supply it with the necessary threaded lengths for permitting it to be readily coupled in its original position.

Figure 1:
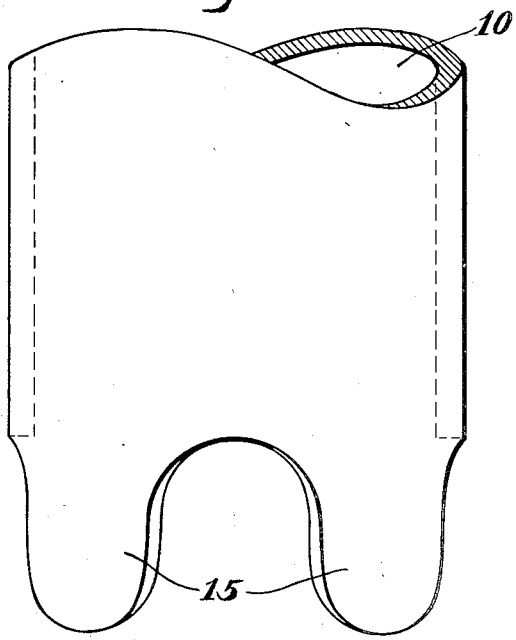
Figure 1 is a view in side elevation illustrating the end of a pipe and particularly showing the manner in which it is prepared for connection to the threaded fitting.
Figure 3:
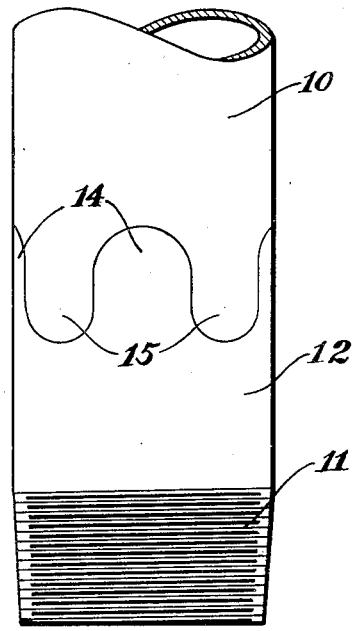
Fig. 3 is a view illustrating the pipe fitting as mounted upon the end of the pipe.
Figure 2:
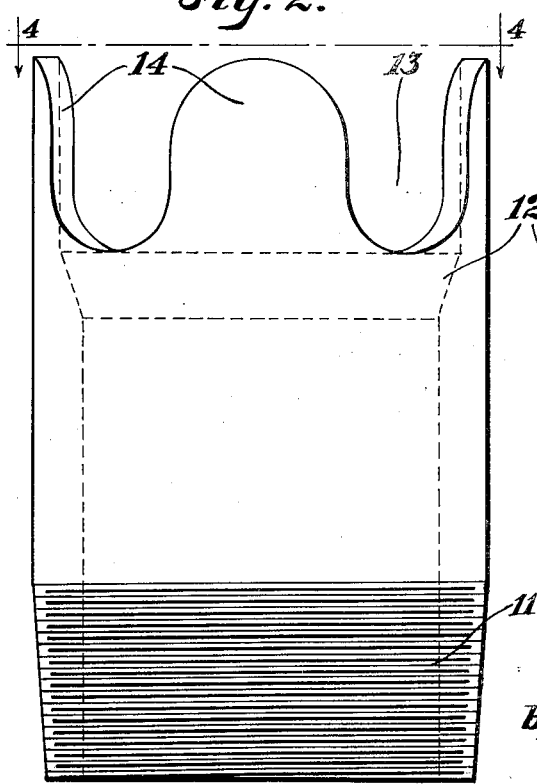
Fig. 2 is a view in side elevation of the threaded fitting and further discloses the manner in which it is formed to interlock with the end of the pipe.
Figure 4:
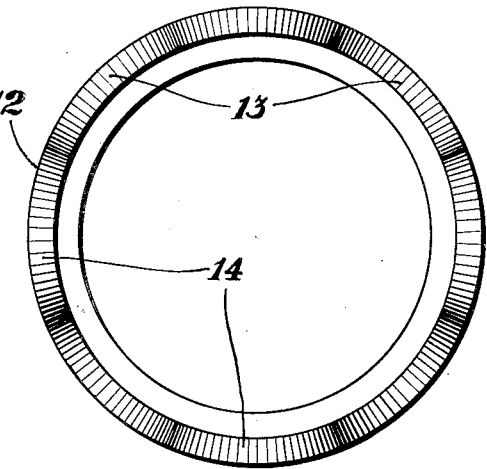
Fig. 4 is a view in plan, as seen on the line 4—4 of Fig. 2 and illustrates the manner in which the end of the pipe is scalloped.

Referring particularly to Figs. 2 and 4 of the drawings, it will be seen that the upper end of this fitting is formed with a series of scallops 13. These scallops are preferably formed with circular gullets and circular teeth of substantially the same arc described by the same radius. This will form a reverse curve which continues around the entire end of the pipe. As here shown four teeth 14 are formed, although it will be understood that any suitable number may be used, if desired. The object of this formation is to provide a maximum welding surface and also to permit the teeth to interlock with teeth 15 formed at the end of the pipe 10 which may be either a new piece or an old piece with the worn out end removed. It will be understood that these teeth are of the same general dimensions as the teeth upon the end of the fitting and that they may be readily welded together, when desired. The pipe fitting is preferably formed of a high-grade steel and is machined into shape, thus preserving the natural strength of the material and permitting the fiber of the metal to remain in its normal condition. This will provide a fitting of great strength and when the threads 11 are formed at its end there will be slight possibility of the threads being stripped, or the fitting being broken. It has been found in practice that the fittings usually break at a point a short distance above the threads and experiment has proved that with the special fitting here described the damaging strains are withstood and the entire drill-pipe made more efficient in its operation than originally.

When the threaded end of a pipe 10 is broken the remaining fractured portion is machined away and teeth 15 are formed by a suitable cutter into the shape previously described. The pipe fitting 12, which has previously been manufactured, is applied to the specially prepared pipe end and after being interlocked therewith is welded by means of any suitable welding process, such as oxy-acetylene process and the like. After the fitting has been welded to the pipe it may be mounted within the original pipe coupling and will permit the pipe to perform the function for which it was originally intended.

The bodies of the worn out drill stems, casings, or pipes may be softened and weakened by age and still be perfectly good when the new ends are applied, care being taken to produce new ends from new, hard, and strong material.

Thus I have produced an interlocking pipe weld which consists in forming tongues upon the end of a drill stem or the like; the ends of the tongues being rounded and there being rounded grooves between the tongues; and forming tongues upon the end of the new nipple having rounded ends to fit in the rounded grooves and having rounded grooves to receive the rounded ends of the other tongues.

I claim:

1. The method of producing a drill stem which consists in taking an old pipe, forming tongues upon the ends of the pipe; the ends of the tongues being rounded and there being rounded grooves between the tongues; taking new nipples and forming tongues upon the ends of the new nipples; the ends of the new nipple tongues being rounded to fit the rounded grooves of the old pipe and there being rounded grooves between the new tongues to receive the rounded tongues of the old pipe; and welding the parts together along the joints thus formed.

2. The method of producing a drill stem which consists in taking an old pipe, forming tongues upon the ends of the pipe; the ends of the tongues being rounded and there being rounded grooves between the tongues; taking new nipples and forming tongues upon the ends of the new nipples; the ends of the new nipple tongues being rounded to fit the rounded grooves of the old pipe and there being rounded grooves between the new tongues to receive the rounded tongues of the old pipe; and welding the parts together along the joints thus formed; the walls of the new nipples being thicker than the wall of the old pipe.

3. A drill stem consisting of an old pipe having tongues extending from its ends; the ends of the tongues being rounded and there being rounded grooves between the tongues; and new thicker nipples having ends provided with tongues; the ends of the tongues being rounded to fit in the grooves of the old pipe and there being rounded grooves between the tongues of the nipples to receive the rounded ends of the tongues of the old pipe.

In testimony whereof I have signed my name to this specification.

FRED GARDNER LIADY.